(12) United States Patent
Oeda et al.

(10) Patent No.: US 6,329,794 B1
(45) Date of Patent: Dec. 11, 2001

(54) INFORMATION PROCESSING DEVICE AND METHOD FOR CONTROLLING POWER CONSUMPTION THEREOF

(75) Inventors: Shigeto Oeda, Fujisawa; Naoki Mori; Hiromichi Ito, both of Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/657,151

(22) Filed: Sep. 7, 2000

(30) Foreign Application Priority Data

May 22, 2000 (JP) .................................................. 12-154358

(51) Int. Cl.[7] .................................................. H02J 7/00
(52) U.S. Cl. ........................................... 320/132; 320/130
(58) Field of Search .................................. 320/132, 134, 320/139, 130; 324/426, 428

(56) References Cited

U.S. PATENT DOCUMENTS 5,969,529 * 10/1999 Eiraku et al. ........................ 324/433
6,049,210 * 4/2000 Hwang .................................. 320/134
6,100,666 * 8/2000 Ryu ...................................... 320/132

OTHER PUBLICATIONS

Research File No. 5, ACPI, POS/V Magazine (1999), 7.15, p. 210.

* cited by examiner

*Primary Examiner*—Peter S. Wong
*Assistant Examiner*—Lawrence Luk
(74) *Attorney, Agent, or Firm*—McDermott, Will & Emery

(57) ABSTRACT

A power supply section includes a capacity detector capable of detecting the remaining capacity in a battery and a controller issuing power consumption reduction instructions to independently operable function devices based on usage priorities thereof. This allows power consumption operations to be performed such as stopping function devices with low priorities first based on the remaining battery capacity. As a result, power to function devices with higher priorities can be maintained. Based on the remaining battery capacity, the controller controls the operations of the function devices and uses a display to show information allowing the operator to identify operable and inoperable function devices as the battery capacity drops.

14 Claims, 10 Drawing Sheets

INFORMATION PROCESSING DEVICE AND METHOD FOR CONTROLLING POWER CONSUMPTION THEREOF

BACKGROUND OF THE INVENTION

The present invention relates to an information-processing device in which a plurality of independent function devices is driven by a common power supply. More specifically, the present invention relates to a battery-operable information processing device and a method for controlling power consumption for the same.

Conventionally, power consumption control in battery-operable information processing devices such as notebook computers is performed using methods such as: (a) increasing efficiency of the power supply section or the battery; (b) reducing the power consumption of devices serving as function devices; (c) stopping or restricting operations of functions when they are not used. An extension of these methods involves keeping power cut off from functions such as modem functions in notebook computers that are used only under specific conditions.

In these conventional technologies, power conservation in the information processing devices is performed with the goal of providing the power required for operation of individual functions to the extent possible. In the conventional technologies described above, power is supplied equally to multiple function devices sharing a single power supply. Thus, no consideration is given to cases where there are different priorities in the multiple independently operable functions. For example, in an information processing device with an audio communication function (function device A) and a videophone function (function device B) sharing a power supply, the function device A would generally have a higher priority. However, with the power saving control system of the conventional technology, the continued use of the function device B will eventually reduce the battery capacity in the power supply to the point where the function device A will be inoperable. To prevent this, the user needs to explicitly stop using the function device B. In this example, the basis for priority is the function that needs to be used when a drop in battery capacity means only one of the functions can be used. In practice, priority levels are determined based on the power consumed by individual functions and the situation of individual users.

SUMMARY OF THE INVENTION

The object of the present invention is to provide an information processing device that can maintain power in a prioritized manner to independent function devices with higher usage priorities. Another object of the present invention is to provide a method for controlling power consumption of an information processing device.

In the present invention, a power supply circuitry includes a capacity detector detecting a remaining capacity of a battery and a controller issuing power consumption reduction instructions to independently operable function devices based on their priority levels. As a result, power consumption reduction operations are possible such as stopping function devices with low priorities first based on the remaining capacity in the battery. This allows power to be maintained for function devices with high priorities. In the example with the phone described previously, the function device A can continue to be used by stopping the function device B first. Thus, more convenience is provided when the battery capacity is low.

Also, in the present invention, a control circuit controls the operations of function devices based on the remaining battery capacity. Displaying means is provided so that as the remaining battery capacity drops, the operable function devices and inoperable function devices can be identified. As a result, the user can easily know which functions are operable at a given time.

Also, in the present invention, the function device B is stopped automatically when the battery capacity reaches a reference value. Thus, there is no burden placed on the user. Furthermore, if there is adequate battery capacity, the user is ensured selective use of both the function device A and the function device B, which provide the standard functions of the information processing device. Compared to the conventional technology described above, where the user explicitly stops using the function device B, ease of use is improved. Also, problems such as forgetting to make settings to prohibit use of the function device B, as is possible in the conventional technology, can be eliminated, thus improving reliability.

In an information processing device powered by a battery, which is a finite power source, the present invention allows priority levels to be set for individual functions in the information processing device. Thus, battery time can be maintained in a prioritized manner for the function devices with higher priorities. This improves reliability.

Also, as the remaining battery capacity drops, information is displayed to allow identification of operable function devices and inoperable function devices. Thus, the user can easily know which functions are operable at a given moment.

Furthermore, the present invention can provide priority-based power consumption control even if multiple functions share a function device. This allows greater ease of use. Also, needed common function devices can be kept operable while the function devices with low priorities can be limited first. This provides improved reliability.

BRIEF DESCRIPTION OF THE DRAWING

These and other features, objects and advantages of the present invention will become more apparent from the following description when taken in conjunction with the accompanying drawings wherein.

DETAILED DESCRIPTION OF PREFERRED EMBODIMENTS

Figure 1:
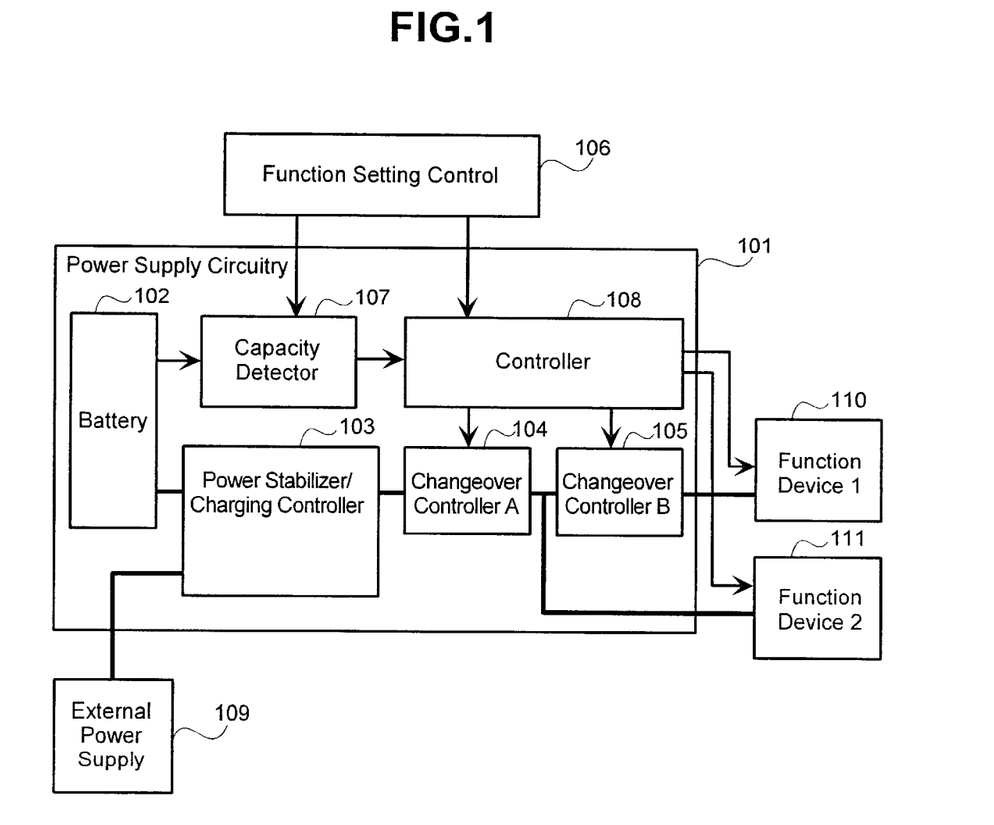
FIG. 1 is a drawing showing the architecture of a power supply section of an embodiment of the present invention.

The following is a description of an embodiment of the present invention, with references to FIG. 1, FIG. 2, FIG. 4, FIG. 5, FIG. 8, and FIG. 9. In FIG. 1, a power supply section 101 supplies power to the various functions in an information processing device. The power supply section 101 includes: a battery 102 such as a primary battery or a secondary battery; a power stabilizer/charging controller 103 stabilizing power supplied by the battery and, if the battery 102 is a secondary battery, controlling charging; a changeover controller A 104 capable of switching between activation and stopping of power to a function device 1 and a function device 2; a changeover controller B 105 capable of switching between activation and stopping of power to the function device 1; a capacity detector 107 detecting the remaining capacity of the battery; and a controller 108 controlling the changeover controllers A, B and sending power consumption reduction instructions to the function devices 1, 2. The power supply section 101 is connected to: a function setting controller 106 capable of selecting and setting up operations of the capacity detector 107, the controller 108, and the like; an external power supply 109 such as an AC adapter; and a function device 1 110 and a function device 2 111 implementing functions of the information processing device.

Figure 8:
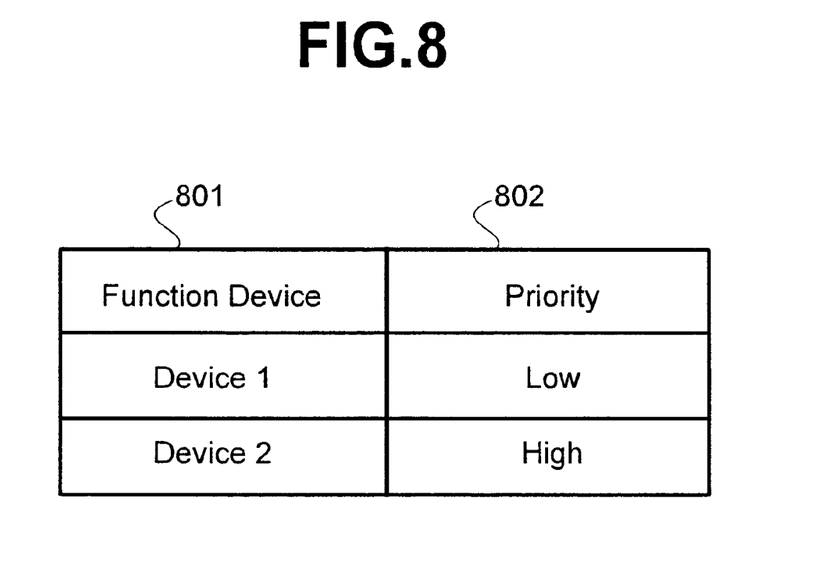
FIG. 8 is a drawing showing the structure of a priority table storing priority levels for function devices according to an embodiment of the present invention.

The following is a description of the operations performed by the power supply section of this embodiment. Usage priorities are set up for the function devices capable of operating independently. The usage priorities are set up using the function setting controller 106 when the information processing device is initialized or when a user wants to change settings. In practice, the function setting controller can, for example, be equipped with a settings switch to allow usage priorities to be set for individual function devices. The usage priorities that have been set up are stored in a storage circuit in the controller 108. FIG. 8 shows an example of a usage priority settings table.

Figure 9:
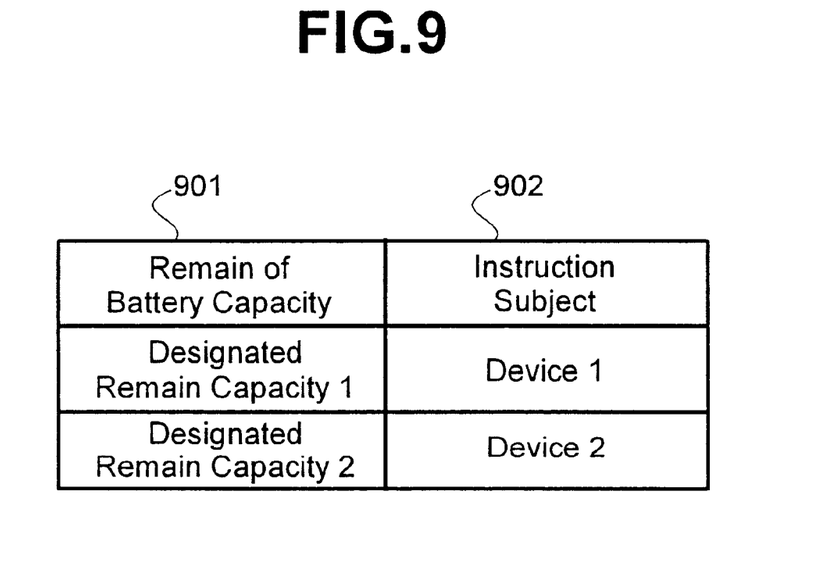
FIG. 9 is a function association table indicating the relationship between remaining capacities and function devices to which power consumption reduction notifications are to be sent according to an embodiment of the present invention.

In FIG. 8, a column 801 contains each of the function devices in the information processing device, and a column 802 contains the usage priorities for each of these function devices. The controller 108 uses these usage priorities as a reference to generate a function association table defining that indicates which function device should receive a power consumption reduction instruction when the battery 102 has a certain remaining capacity. FIG. 9 shows an example of this function association table. In FIG. 9, a column 901 contains values for reference battery capacities at which power consumption reduction instructions are to be issued, and a column 902 contains the devices to which power consumption reduction instructions are to be issued for these capacities. Assuming reference capacity 1>reference capacity 2, a power consumption reduction instruction will be issued to the function device 1 when the reference capacity 1 is reached since the priority table shown in FIG. 8 indicates that the function device 1 has a lower priority. Also, since the function device 2 has a higher priority, it will receive a power consumption reduction instruction when the capacity 2 is reached. The controller 108 generates the function association table based on the priority table by performing the operations described above.

The embodiment described below will indicate a control method in which there are two function devices, two priority settings, and two reference capacities. However, the same operations can be applied to arrangements with N function devices and M priority settings and reference capacities.

Figure 4:
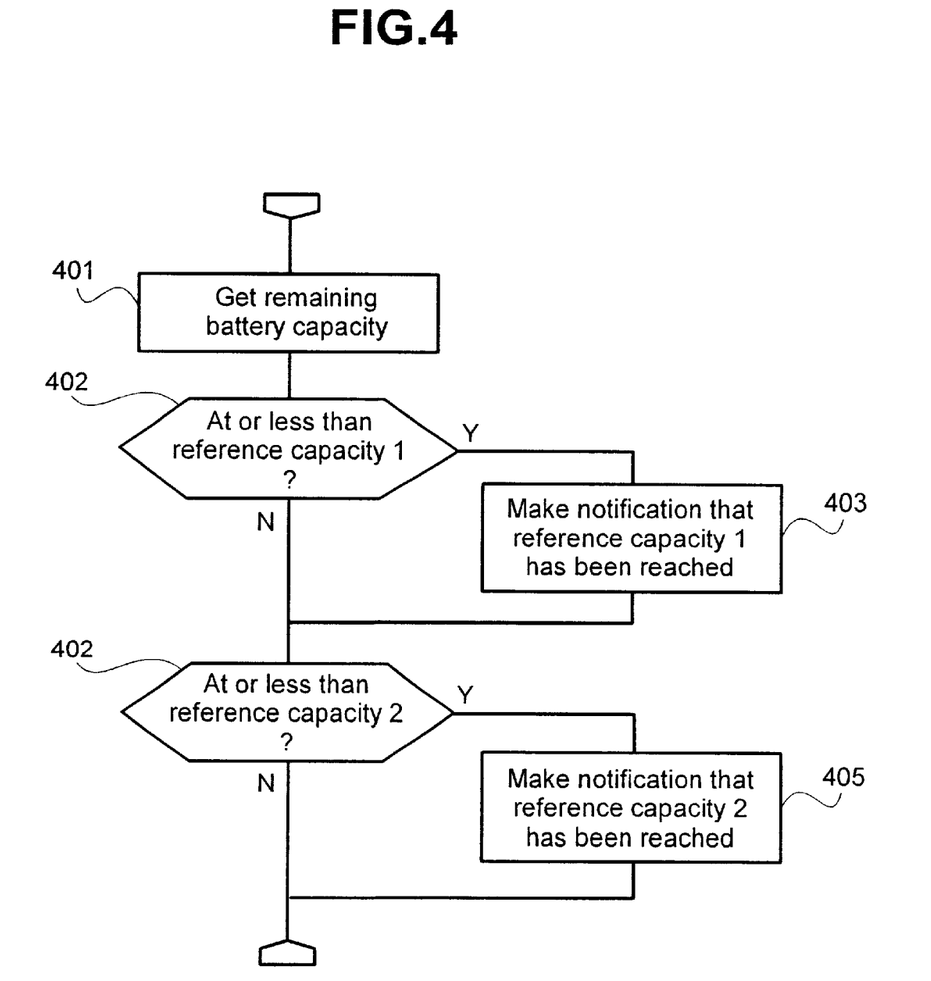
FIG. 4 is a flowchart showing the operations performed by a capacity detector of a power supply section according to an embodiment of the present invention.

The following is a description of the operations performed for the different functions of the power supply section. The priority table and the function association table shown in FIG. 8 and FIG. 9 will be used. FIG. 4 shows the operations performed by the capacity detector 107. The capacity detector 107 periodically performs the operations in FIG. 4.

In FIG. 4, the remaining capacity of the battery 102 is retrieved at operation 401. At operation 402, this is compared to the reference capacity 1 in the column 901 of the function association table. If the remaining capacity of the battery is at or less than the reference capacity 1, operation 403 notifies the controller 108 that the remaining capacity of the battery is at or less than the reference capacity 1. Similarly, the operations 404, 405 determine whether the remaining capacity in the battery is at or below the reference capacity 2 and notifies the controller 108 if it is at or below the reference capacity 2.

Figure 5:
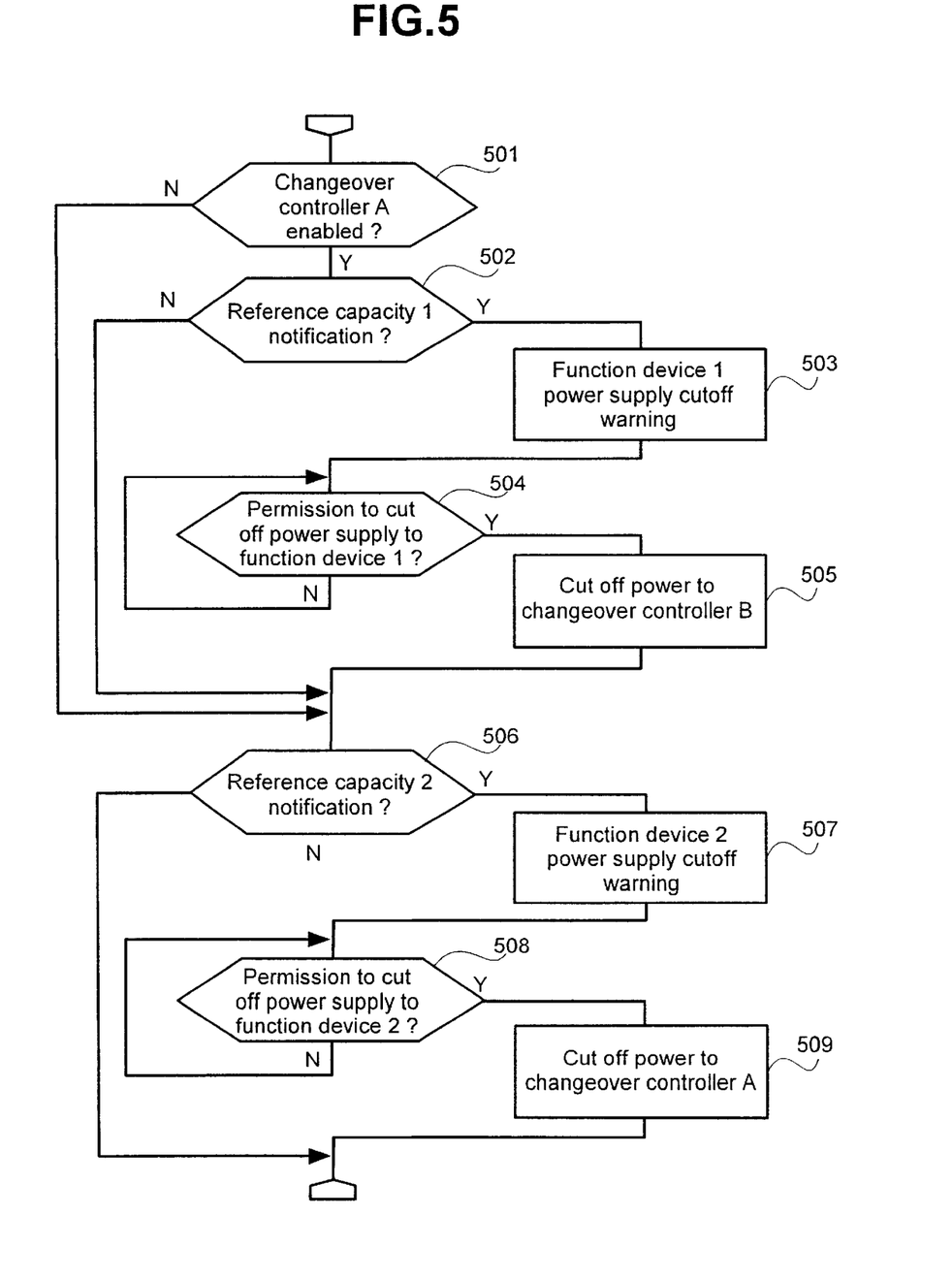
FIG. 5 is a flowchart showing the operations performed by a controller in a power supply section according to an embodiment of the present invention.

FIG. 5 shows the operations performed by the controller 108. The controller 108 performs the operations in FIG. 5 periodically. In FIG. 5, operation 501 checks the enabled/disabled setting for the changeover controller B, contained in the storage circuit of the controller. The enabled/disabled setting (not shown in the figures) for the changeover controller B can be set and changed by a user using the function setting controller 106, as in the usage frequency table. By setting up the enabled/disabled setting for the changeover controller B, the user can enable or disable priority-based power consumption control. If the setting is enabled, operation 502 checks whether there has been a notification from the capacity detector circuit 107 that the reference capacity 1 has been detected. If a notification was received, the function association table in FIG. 9 is searched, and a power consumption reduction instruction is sent to the corresponding function device 1. In this embodiment, a power consumption reduction instruction is assumed to mean cutoff from the power supply. Thus, in the following description the power consumption reduction instruction will be referred to as a power supply cutoff warning.

The function device 1 receives the power supply cutoff warning from the controller 108 and puts the function device 1 in a state where a cutoff from the power supply will not lead to problems. After this is done, the function device 1 sends the controller 108 a power consumption reduction completion notification. In the following description of this embodiment, a power supply cutoff permission notification will serve as the power consumption reduction completion notification. The controller 108 checks for a power supply cutoff permission notification from the function device 1 (110) at operation 504. Once this notification is issued, the changeover controller B (105) cuts off power at operation 505. Next, at operation 506, the controller 108 checks for notification regarding reference capacity 2. If a notification is received from the capacity detector 107, operations similar to those described above are performed to cut off power to the function device 2 using the changeover controller A (104). In standard operations, the controller 108 performs the operations shown in FIG. 5 are executed periodically. When the remaining capacity in the battery is detected to be at reference capacity 1 or lower, operation 501 through operation 505 are executed to cut off the power to the function device 1. When subsequently the battery capacity drops further due to use of the function device 2 or the like, operation 506 through operation 509 are performed when the capacity reaches reference capacity 2 or below. This cuts off the power to the function device 2.

With the operations performed in the power supply section of this embodiment as described above, power to individual function devices can be cut off according to the remaining capacity in the battery based on priority levels for the function devices 1, 2 as set up by the user.

More specifically, when battery capacity 1 is reached, power to the function device 1 is first cut off. Then, when battery capacity 2 is reached, the power to the function device 2 is cut off. Thus, compared to conventional power supply sections that simultaneously cut off power to the function devices 1, 2, the function device 2 having a higher priority can be operated for a longer period.

In this embodiment, priority levels are set up by the user. However, it would also be possible to have default settings in the system and to have the user make priority settings only if the user requests a change in settings. Furthermore, it would also be possible to have a system where the priority levels are defined beforehand so that the user does not make settings.

Also, in this embodiment, the battery capacities in the function association table from FIG. 9 are defined by the system. However, it would also be possible to have these battery capacities set up by the user using the function setting controller 106.

Figure 2:
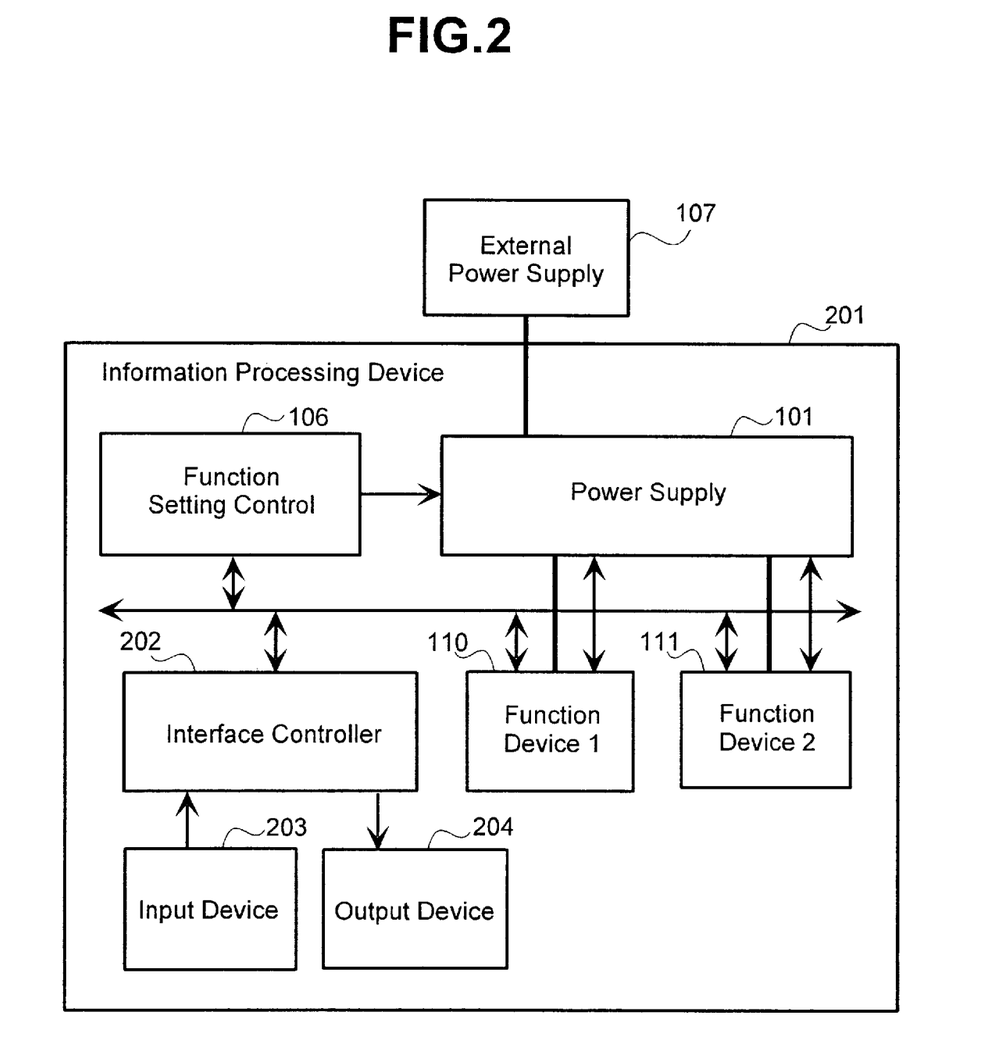
FIG. 2 is a drawing showing the architecture of an information processing device equipped with a power supply section according to an embodiment of the present invention.

The following is a description, with references to FIG. 2, of an information processing device that uses the power supply section of this embodiment as described above.

In FIG. 2, an information processing device 201 such as a personal computer, a home appliance, or a wireless information device includes an interface controller 202, an input device 203 such as a keyboard or panel, and an output device 204 such as a display or speaker. If the remaining capacity in the battery is at or above reference capacity 1, both the function device 1 and the function device 2 can be used. As the remaining capacity in the battery is reduced due to use of the function device 1 or the function device 2 or the like and drops to reference capacity 1, the power supply section 101 will, as described above, target the function device 1 for power supply cutoff. After the function device 1 is stopped, power is cut off. Thus, the function device 1, which was set up by the user to have a lower priority setting, is stopped first when the battery capacity drops. Since the cutoff of power to the function device 1 provides more power capacity for use by the function device 2, the function device 2 will be usable even after the function device 1 is stopped. Finally, as the remaining capacity in the battery drops further due to the operations of the function device 2 or the like, power to the function device 2 will be cut off when the reference capacity 2 is reached.

With this embodiment, a battery-operated information processing device can have usage priorities assigned based on different functions in the information processing device. Thus, more battery time can be provided for function devices having higher priorities, and the device is made more convenient.

Figure 3:
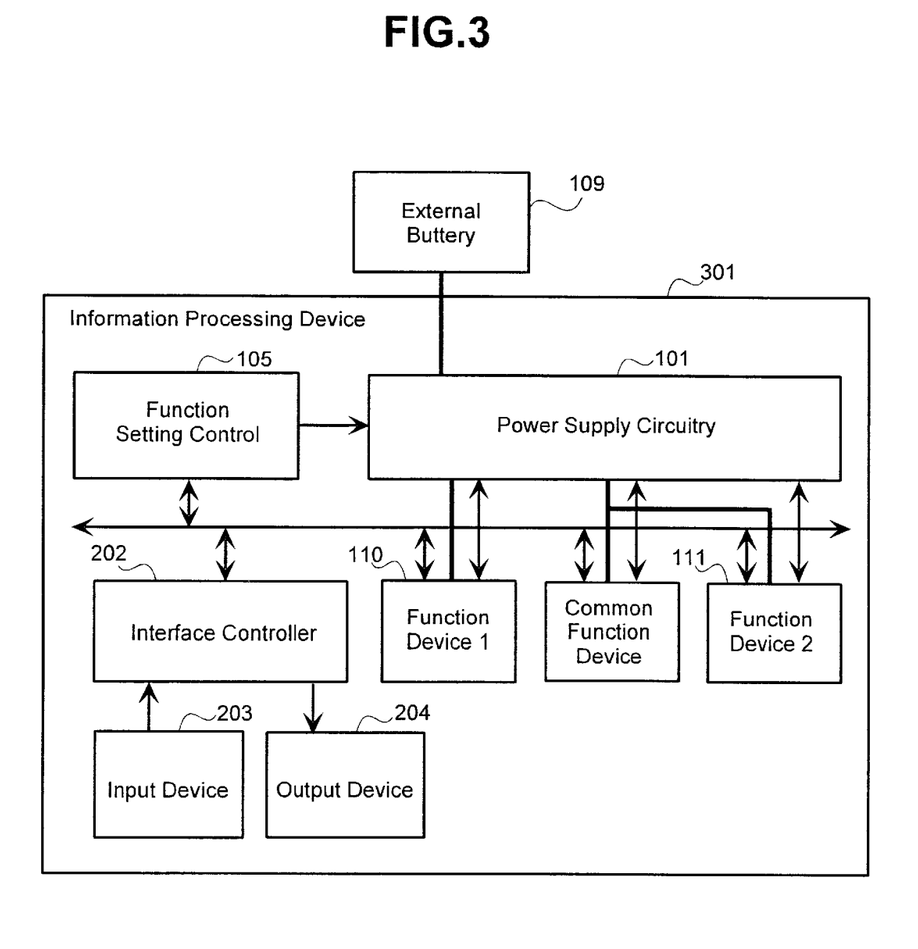
FIG. 3 is a drawing showing the architecture of an information processing device equipped with a power supply section according to another embodiment of the present invention.

The following is a description, with references to FIG. 3, of another embodiment of the present invention. FIG. 3 shows the architecture of an information processing device equipped with a power supply section according to this embodiment. In FIG. 3, an information processing device 301 includes a common function device 302 needed by both the function device 1 (110) and the function device 2 (111). The power supply section 101 in this embodiment operates in a similar manner as the power supply section from the previous embodiment. Examples of a common function device 302 include CPU and memory. The devices specific to the functions 1, 2 are provided through the function devices 1, 2, and control of these are provided through the common CPU and memory.

When the remaining capacity of the battery 102 reaches reference capacity 1 or lower, the controller 108 of the power supply section 101 issues a power supply cutoff warning to the function device 1 (110). The function device 1 performs operations associated with the power supply cutoff warning such as stopping operations and then sends a power supply cutoff permission notification to the controller 108. At this point, the common function device 302 continues to operate normally. Next, when the remaining capacity of the battery 102 reaches reference capacity 2 or lower, the controller 108 sends power supply cutoff warnings to the function device 2 (111) and the common function device 302. The function device 2 and the common function device 302 each stop operations in response to the power supply cutoff warning and finally sends power supply cutoff permission notifications to the controller 108. At this point, power to the function device 2 and the common function device 302 are cut off.

With the embodiment described above, priority-based power consumption control is possible when multiple functions share a common function device. This provides greater convenience in use. Also, power to function devices with lower priorities can be cut off while leaving the necessary common function device operating, thus improving reliability. Next, another embodiment of the present invention will be described, with references to FIG. 6 and FIG. 7. This embodiment shows the operations of the power supply section according to the present invention in an information processing device that switches to power-saving operation using only the function devices.

Figure 6:
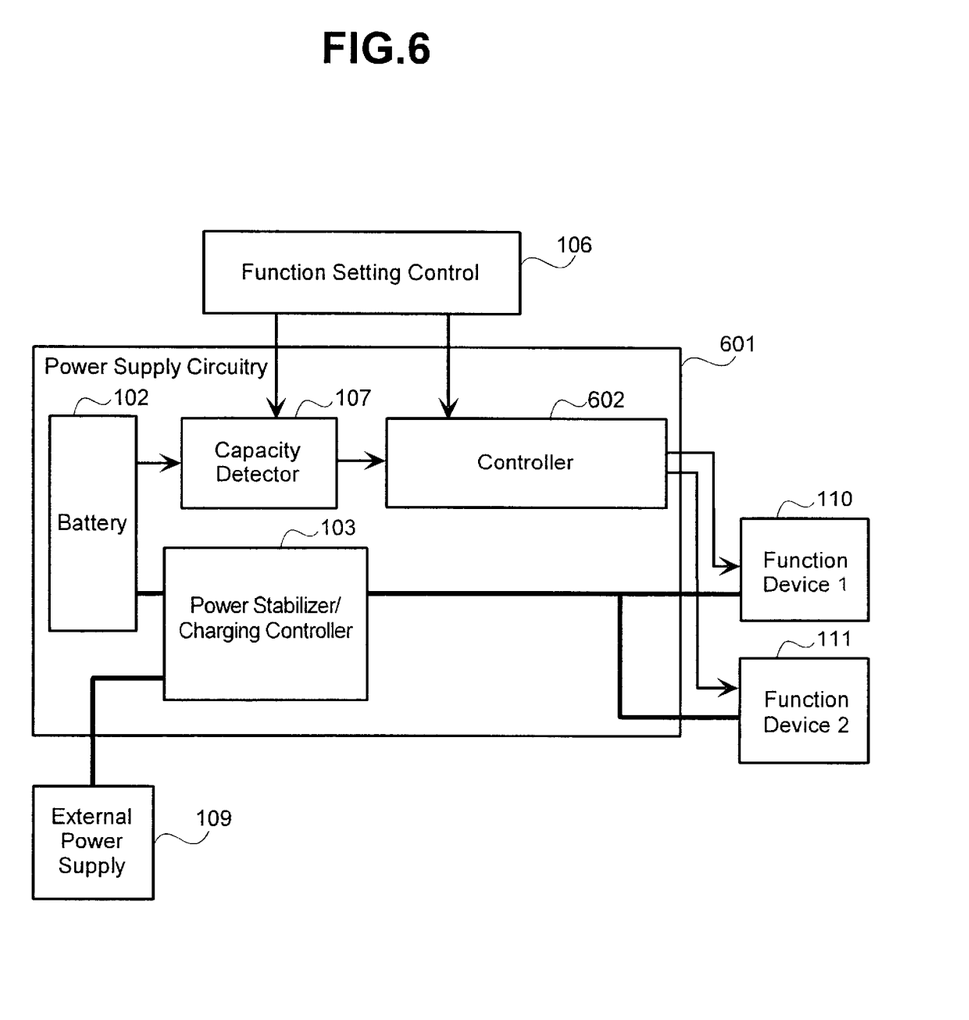
FIG. 6 is a drawing showing the architecture of an information processing device equipped with a power supply section according to another embodiment of the present invention.

In FIG. 6, a power supply section 601 includes a controller 602 that sends power consumption reduction instructions to the function devices. Using the priority table and the function association table, the controller 602 controls power based on priority as in the previous embodiment.

Figure 7:
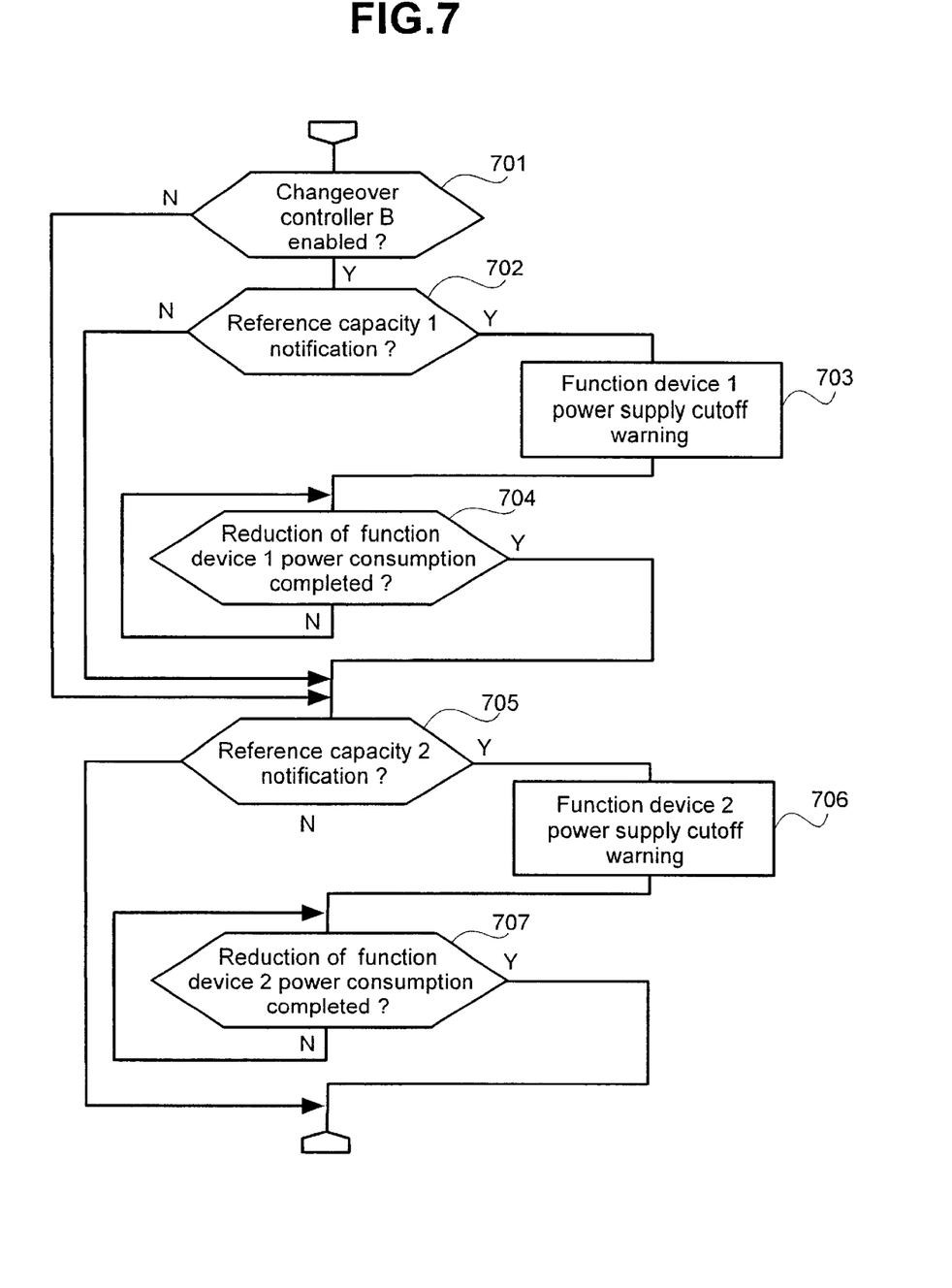
FIG. 7 is a flowchart showing the operations performed by a controller in a power supply section according to another embodiment of the present invention.

The following is a description of the operations performed by the controller 602, with references to FIG. 7. The controller 602 periodically executes the operations in FIG. 7. In FIG. 7, operation 701 checks the enabled/disabled setting for the changeover controller B in the storage circuit in the controller. While not indicated in the figures, the enabled/disabled setting can be set up and changed by the user using the function setting controller 106, as in the usage frequency table.

This enabled/disabled setting for the changeover controller B allows the user to enable or disable priority-based power consumption control. If the setting is enabled, the controller 602 checks to see if a detection notification from the capacity detector 107 is present. If a notification is present, the function association table in FIG. 9 is searched and a power consumption reduction instruction is sent to the corresponding function device 1. The function device 1 receives the power consumption reduction instruction and performs power consumption reduction operations such as stopping operations or reducing operating speed. Once the power consumption reduction operations are finished, a notification is sent to the controller 108 to indicate that the power consumption reduction instruction has been completed. The controller 602 checks to see that the notification indicating completion of power consumption reduction has been received from the function device 1 (110). Next, in operation 705, notification for capacity 2 is checked. If a notification is received from the capacity detector, similar operations are performed to reduce power consumption in the function device 2.

With this embodiment, power consumption control according to the present invention is possible with information processing devices that are not capable of changeover control and devices for which power consumption reduction is possible only for the function devices. Thus, priority-based power consumption control can be provided for individual function devices even in information processing devices that are not capable of changeover control.

Also, with this embodiment, the power consumption control of the present invention can be used in information processing devices for which providing changeover control is difficult due to restrictions such as the price or the number of parts in the information processing device.

Figure 10:
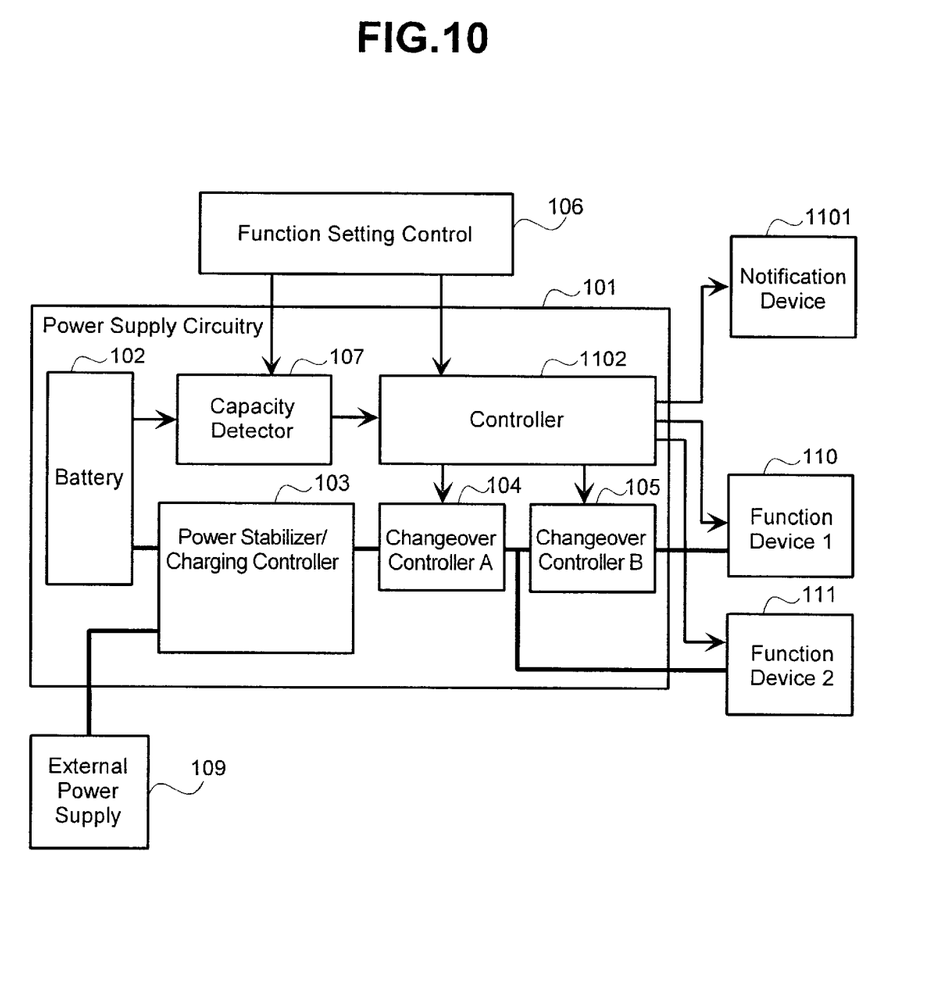
FIG. 10 is a drawing showing the architecture of an information processing device equipped with a power supply section according to another embodiment of the present invention.

The following is a description of another embodiment of the present invention, with references to FIG. 10. In FIG. 10, the power supply section 101 includes a controller 1102 controlling power consumption by controlling the power supply for the function devices 110, 111. The power supply section 101 is connected to a notification device 1101 such as an LED or liquid crystal display device used to indicate the operating status of the function devices 110, 111 to the user. Based on whether the changeover controllers 104, 105 are connected or disconnected, the controller 1102 uses the notification device 1101 to notify the user of whether the function devices 110, 111 are enabled or disabled. If the changeover controllers 104, 105 are both connected, the controller 1102 controls the notification device 1101 so that an indication that the function devices 110, 111 are both enabled. If the changeover controller 104 is connected and the changeover controller 105 is disconnected, an indication that the function device 110 is disabled and that the function device 111 is enabled is displayed on the notification device 1101. If the changeover controllers 104, 105 are both disconnected, an indication that the function devices 110, 111 are both disabled is displayed on the notification device 1101. Also, if a function device is disabled, this can be indicated to the user by providing no display.

With this embodiment described above, the user can determine the status of the function devices 110, 111 through the notification device 1101, thus improving reliability. In this embodiment, the notification device 1101 is formed independently. However, the implementation of the notification device is not restricted to this. For example, it would be possible to have a notification device contained in the function device 2 or to use an output device 204 of the information processing device 201 equipped with the power supply section 101. Also, the notification method is not restricted to using a display and can, for example, involve audio notification.

Figure 11:
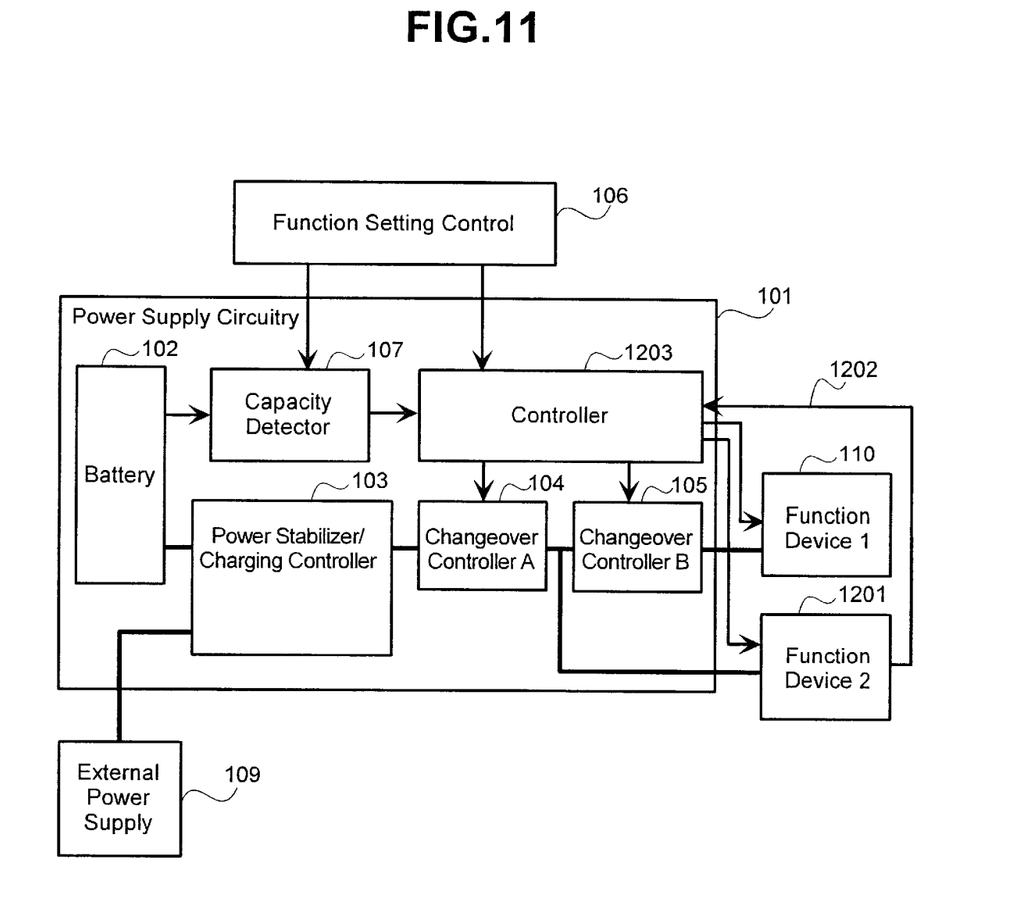
FIG. 11 is a drawing showing the architecture of an information processing device equipped with a power supply section according to another embodiment of the present invention.

The following is a description of another embodiment of the present invention, with references to FIG. 11. In FIG. 11, a function device 1201 can operate independently and can send an operation request signal 1202 from the function device 110 to a controller 1203. In addition to controlling the power consumption of the function devices 110, 111 as described above, the controller 1203 is also able to change the connection/disconnection state of the changeover controller 105 based on operation requests in the operation request signal 1202.

When the battery capacity has dropped to or below the reference capacity 1 so that the function device 110 is stopped and only the function device 1201 is operating, if a specific operation of the function device 1202 requires a function of the function device 110, the function device 1201 sends a request to resume the operation of the function device 110 to the controller 1203 via the operation request signal 1202. The controller 1203 receives this and puts the changeover controller 105 in the connected state and, if necessary, notifies the function device 1 of the resumption of operations.

In this embodiment as described above, the function device 110 can be put in a power-saving state depending on the remaining battery capacity even if at least some of the functions of the function device 1201 assume the operation of the function device 110. This improves the effectiveness of the power-saving control operations. Furthermore, when the function device 110 becomes necessary, the function device 1201 can request that operation of the function device 110 be resumed, thus improving ease of use.

We claim:

1. An information processing device comprising:
   at least two function devices equipped with independent functions; and
   a power supply circuit for supplying power to each of said function devices, said power supply circuit including a battery, a capacity detector for detecting a remaining capacity of said battery, and a controller for controlling operation of said function devices based on said remaining capacity;
   wherein when said capacity detector detects remaining battery capacities NA and NB (where NA>NB), said controller sends a power consumption reduction instruction to each function device included in a set GA if NA is detected, each function device of the set GA having a lower usage priority, and to each function device of a set GB if NB is detected, each function device of set GB is not included in said set GA.

2. An information processing device according to claim 1, wherein at least one of said power consumption reduction instructions is an instruction to stop a corresponding function device.

3. An information processing device according to claim 1, wherein said power supply circuitry includes a changeover device capable of cutting off power to part or all of at least one function device, said controller controlling said changeover device based on said remaining capacities NA and NB of said battery.

4. An information processing device according to claim 3 wherein said controller notifies said function device that power will be cut off before said changeover device cuts of power.

5. An information processing device according to claim 1, wherein at least a portion of said usage priorities can be set up by a user using a function settings procedure.

6. An information processing device according to claim 5 wherein if said user does not set up said usage priorities for said function devices, pre-set values are used as usage priorities for said function devices.

7. An information processing device according to claim 1, wherein if said function devices with high usage priorities require another function device, said other function device is reactivated if it is stopped due to reduced capacity.

8. An information processing device according to claim 1, further comprising a function device common to a plurality of independent functions, said common function device being allowed to operate to the end.

9. An information processing device comprising:

component devices for performing different functions in the device, each of said component devices having a corresponding power supply;

a battery supplying power;

a capacity detector detecting a remaining battery capacity of said battery;

a controller sending a first power consumption reduction instruction to a portion of said component devices having a lower usage priority when said capacity detector detects a first reference level, and sending a second power consumption reduction instruction to another portion of said component devices having a higher usage priority when said capacity detector detects a second reference level, said second reference level is lower than said first reference level; and wherein the power supplies of said component devices are controlled according to said first power consumption reduction instruction and said second power consumption reduction instruction.

10. An information processing device according to claim 9, wherein at least one of said first power consumption reduction instruction and said second power consumption reduction instruction is an instruction to stop a corresponding component device.

11. An information processing device according to claim 9, wherein at least a portion of said usage priorities can be set up by a user using a function settings procedure.

12. An information processing device according to claim 11, wherein if said user does not set up said usage priorities for said component devices, pre-set values are used as usage priorities for said component devices.

13. An information processing device according to claim 9, wherein if said component devices with higher usage priorities require another component device, said another component device is reactivated if it is stopped due to reduced capacity.

14. An information processing device according to claim 9, further comprising a component device common to a plurality of independent functions, said common function device being allowed to operate to the end.

* * * * *